(No Model.)

S. K. SEELYE.
STRETCHER FOR ENDLESS CONVEYERS.

No. 346,868. Patented Aug. 3, 1886.

Witnesses:
John B. Caspari
Francis W. Parker

Inventor:
Seymour K. Seelye
By His Att'y
Chas. D. Burton

UNITED STATES PATENT OFFICE.

SEYMOUR K. SEELYE, OF HUDSON, MICHIGAN.

STRETCHER FOR ENDLESS CONVEYERS.

SPECIFICATION forming part of Letters Patent No. 346,868, dated August 3, 1886.

Application filed February 8, 1886. Serial No. 191,117. (No model.)

*To all whom it may concern:*

Be it known that I, SEYMOUR K. SEELYE, a citizen of the United States, residing at Hudson, in the county of Lenawee and State of Michigan, have invented certain new and useful Improvements in Stretchers for Endless Conveyers, which are fully described in the following specification.

This invention is designed to be applied to any endless conveyer; but I have herein particularly illustrated and will describe it as applied to the elevating-conveyers of a harvesting-machine. It is designed to afford a more simple and convenient means than has been hitherto employed for tightening the endless elevating belts or aprons of a harvesting-machine when they become slack, and for slackening them when not in use, to prevent the strain upon them and upon their supporting-frame, which may result from the contraction of the belts under the influence of moisture.

Figure 1:
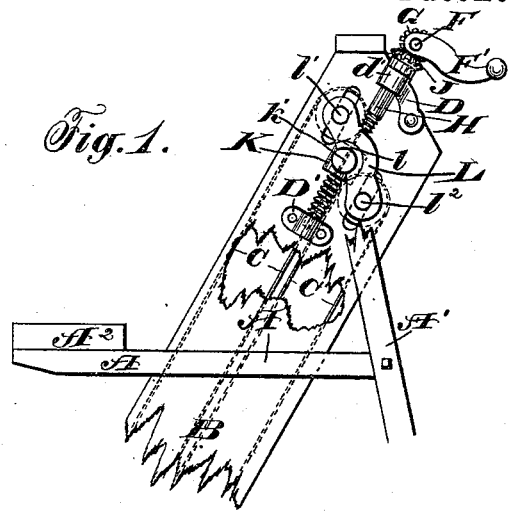
Figure 2:
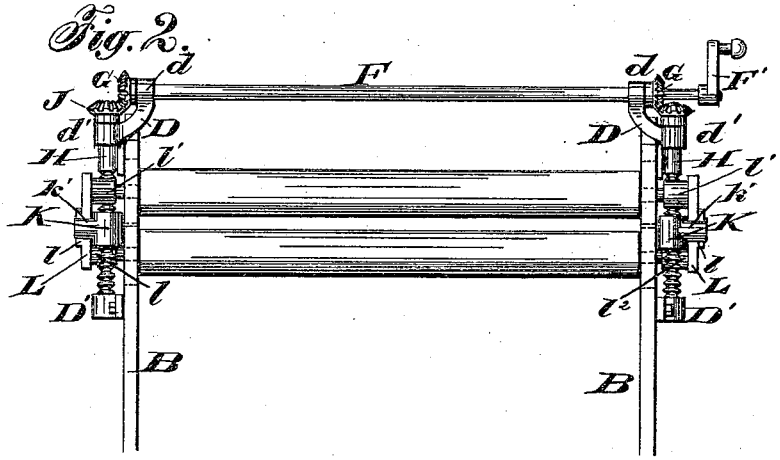

In the drawings, Figure 1 is a rear edge elevation of the elevator-frame having my invention connected thereto, and having the lower part, including the driving mechanism, broken away. Fig. 2 is an inner side elevation of the mechanism which constitutes my invention, enough only of the elevator-frame being shown to illustrate the manner and position in which it is secured thereto.

A and A' are bars of the A-frame, which strides the drive-wheel and supports the elevator.

$A^2$ is the seat-plank.

B B are the elevator side boards.

C C are the elevating-belts.

D D are brackets, secured one to each of the elevator side boards, B B, at the upper end, and having each two journal-bearings, $d$ and $d'$, at right angles with each other, for the purpose hereinafter explained.

D' D' are small boxes, secured one to each of the elevator side boards, B B, on the outside, some distance below the upper end.

The bearings $d\,d$ in the brackets D D are in line and horizontal, and each of the bearings $d'\,d'$ is in line with the journal-bearing of the box D' on the same side of the elevator.

In the bearings $d\,d$ is journaled the horizontal shaft F, having fixed upon it, outside of its said bearings, respectively, the equal bevel-pinions G G, and in the bearings $d'\,d'$ are journaled the shafts H H, having fixed to them above said bearings the bevel-pinions J J, meshing with the pinions G G, respectively. The lower ends of said shafts H H are journaled in the boxes D' D', respectively, and are exteriorly screw-threaded, and between their said bearings $d'\,d'$ they carry the blocks K K, pierced and interiorly screw-threaded to mate the screw-threads on said shafts, and having the gudgeons $k'\,k'$, which enter the bearings $l$ in the levers L, one on each side. Said levers have the bearings $l'\,l^2$ for the shafts of the stretching-rollers of the conveying-belts, said bearings being approximately equidistant from the bearings $l$. A cap-nut or linchpin may be applied to the ends of said roller-shafts, to keep the levers from slipping off. The shaft F has at the rear end a crank-handle, F', by which it may be rotated, and thereby, the screw-shafts H H being rotated, raise or lower the blocks K K and the levers L. If one of the elevating-belts is tighter than the other, the levers will yield to it until the belts exert equal strain upon their shaft-bearings, the levers rocking over the gudgeons $k'\,k'$ as they yield to the belts in either direction.

Beside affording means for adjusting the elevating-belts to proper tension, the levers serve to distribute the strain of their normal operation equally upon the two belts, so that if either is choked or restrained by any cause which does not affect the other directly the levers will transmit such strain equally to the other, and thereby relieve the one primarily subjected thereto, and so sometimes prevent the rupture of the belt, which might otherwise be caused.

I claim—

1. In combination with the stretching-rollers of the upper and lower conveyers, their journal-bearings, respectively, movable in direction of the length of the conveyer-belt, and the levers which connect the bearings of said stretching-rollers at the same end, substantially as set forth.

2. In combination with the upper and lower conveyer-belts having each one roller with movable bearings, the levers which connect said bearings at each end of the rollers, a shaft journaled in bearings supported on the frame and extending across the same, and like and similarly-attached connections from said shaft to the connections between the movable bearings at the two ends, respectively, substantially as set forth.

3. In combination, substantially as hereinbefore set forth, the stretching-rollers of the upper and lower conveyers, the journal-bearings of said rollers, the levers by which those at each end of the rollers are rigidly joined, the longitudinal screw-shafts at the two ends having their journal-bearings rigid with the frame, and their screw-blocks connected, respectively, to the roller-bearing levers, whereby said screw-shafts may stretch both belts at once.

4. In combination with the stretching-rollers of the upper and lower conveyers, like and equal levers, one at each end of the rollers, having the journal-bearings for the latter, and rocking over pivots supported by the frame, substantially as set forth.

5. In combination, substantially as set forth, the stretching-rollers, the levers in which said rollers are journaled, the pivot-blocks of said levers, respectively, pierced in the direction of the movement of the conveyers, and similarly screw-threaded interiorly, the like and equal screw-shafts journaled and stopped on the conveyer-frame and screwed through said pivot-blocks, respectively, the bevel-pinions on the said screw-shafts, the transverse shaft having its journal-bearings rigid with those of the screw-shafts, and the bevel-pinions thereon meshing, respectively, with those of the screw-shafts, and the means for rotating said transverse shaft at will.

In testimony whereof I have hereunto set my hand, in the presence of two witnesses, at Hudson, Michigan, this 11th day of December, A. D. 1885.

SEYMOUR K. SEELYE.

Attest:
G. I. THOMPSON,
F. S. VEDDER.